United States Patent [19]

Bacskai

[11] 4,017,465
[45] Apr. 12, 1977

[54] PROCESS FOR POLYMERIZATION OF 2-PYRROLIDONE

[75] Inventor: Robert Bacskai, Kensington, Calif.

[73] Assignee: Chevron Research Company, San Francisco, Calif.

[22] Filed: Jan. 23, 1975

[21] Appl. No.: 543,384

[52] U.S. Cl. .............................................. 260/78 P
[51] Int. Cl.² ................. C08G 69/24; C08G 69/20
[58] Field of Search ................................ 260/78 P

[56] References Cited

UNITED STATES PATENTS

| | | | |
|---|---|---|---|
| 2,907,755 | 10/1959 | Lautenschlager et al. | 260/78 P |
| 3,158,589 | 11/1964 | Glickman et al. | 260/78 P |
| 3,683,046 | 8/1972 | Jarovitzky | 260/78 P |
| 3,778,402 | 12/1973 | Kimura et al. | 260/78 P |

*Primary Examiner*—Lucille M. Phynes
*Attorney, Agent, or Firm*—J. A. Buchanan, Jr.; Dix A. Newell; S. Russell LaPaglia

[57] ABSTRACT

A process for polymerizing 2-pyrrolidone utilizing an agitated reaction mixture containing an inert nonsolvent and an insoluble salt in order to produce a particulate, or easily comminuted, solid product.

9 Claims, No Drawings

PROCESS FOR POLYMERIZATION OF 2-PYRROLIDONE

BACKGROUND OF THE INVENTION

The conventional polymerization of 2-pyrrolidone to poly-2-pyrrolidone is a bulk polymerization process not conveniently adapted to continuous processing. The process involves adding potassium hydroxide to 2-pyrrolidone, distilling off the water of reaction, adding carbon dioxide, sending the reaction mixture to a container or conveyor and reacting at about 50° C. for several hours. The polymer is then recovered by cutting the solid product into manageable pieces and extracting the alkaline polymerization catalyst and excess monomer with water (U.S. Pat. No. 3,721,652). It would be advantageous to reliably obtain the solid product as a particulate. To this end U.S. Pat. No. 2,739,959 discloses the polymerization of 2-pyrrolidone in a nonsolvent, and U.S. Pat. No. 3,213,066 discloses a process for the polymerization of 2-pyrrolidone in suspension, or bulk, in a ball mill. U.S. Pat. No. 3,683,046 discloses a process of bulk polymerization utilizing a reaction mixture containing carbon black, the alkali metal carbonates and bicarbonates, or a partially polymerized reaction mass in order to effect faster polymerization and higher molecular weight polymer. In U.S. Pat. No. 3,681,293 and U.S. Pat. No. 3,804,813 the partially solidified bulk polymerizate is pelletized and the pellets cured.

SUMMARY OF THE INVENTION

It has now been found that the problem of obtaining a polymer of 2-pyrrolidone in particulate form can be solved by a novel process adaptable to continuous operation.

The invention is a process for polymerizing 2-pyrrolidone which advantageously includes agitating a reaction mixture comprising 2-pyrrolidone, alkaline polymerization catalyst, an inert nonsolvent in weight ratio to 2-pyrrolidone of about 0.2–20:1, preferably about 0.5–4:1, and an insoluble salt in weight ratio to 2-pyrrolidone of about 1–10:1 at a temperature of from about 18° C to about 100° C for from 4 to about 100 hours in order to form a particulate, or easily comminuted, poly-2-pyrrolidone.

DESCRIPTION OF PREFERRED EMBODIMENTS

The process of this invention is specifically applicable to the polymerization of 2-pyrrolidone to form a polymeric carbonamide of relatively high molecular weight which has recurring amide groups separated by a trimethylene radical as an integral part of the main polymer chain. This polymer is poly-2-pyrrolidone (also known as nylon-4). It is capable of being formed into filaments having substantial orientation along the filamentary axis, high tensile strength, and other properties suitable for making into textiles. It can be made into filaments, shaped articles and films by melt spinning, molding and extruding.

In a preferred embodiment of the process, monomer, alkaline polymerization catalyst, polymerization initiator, inert nonsolvent and an insoluble salt, the latter two in weight ratio to total monomer of 2–3:1 and 3–10:1, respectively, are charged to a reactor, or reaction zone, equipped with agitating means to form the reaction mixture. The mixture is agitated at a temperature from about 25° to about 70° C for a period of from about 8 to about 72 hours to form a solid particulate product. The solid product is separated from the reaction mixture and washed with water to substantially remove the salt and catalyst from said solid product.

In order to produce high-quality poly-2-pyrrolidone capable of being formed into fibers, filaments and yarn of commercial textile quality, it is necessary that the 2-pyrrolidone monomer be of high purity. Depending upon the process of manufacture, commercially available 2-pyrrolidone may contain appreciable amounts of various impurities, some of which are believed to interfere deleteriously with polymerization. Purification of the monomer to polymerization grade is achieved by crystallization; distillation; distillation from a boron oxide, as disclosed in U.S. Pat. No. 3,806,427; aqueous caustic hydrolysis and distillation, as disclosed in U.S. Pat. No. 3,721,652; acid treatment and distillation, as disclosed in U.S. Pat. No. 3,721,652; and these and other purification techniques in combination.

The process of the present invention is just as applicable to the production of polymers of substituted pyrrolidone, such as 4-methyl-2-pyrrolidone, and copolymers of 2-pyrrolidone, such as with caprolactam, as to the production of poly-2-pyrrolidone. Consequently, in general, and unless otherwise indicated, the words "monomer" and 2-pyrrolidone are interchangeable and monomer also denotes 2-pyrrolidone, substituted 2-pyrrolidone, and any compound capable of copolymerizing with 2-pyrrolidone under the stated conditions of alkaline polymerization catalysis.

The inert nonsolvent is a non-reactive anhydrous monomer-nonsolvent liquid such as hexane or heptane. Neither monomer nor 2-pyrrolidone are appreciably miscible or soluble in the inert nonsolvent finding use within the scope of the present invention. Such nonsolvents include, in addition to heptane and hexane, pentane, cyclohexane, hexene, cyclohexene, octane, isooctane, octene, petroleum fractions such as kerosene, aliphatic mineral oil, gasoline, and other saturated and unsaturated liquid hydrocarbons and mixtures thereof. The $C_5$–$C_{10}$ nonaromatic hydrocarbons, such as hexene, hexane, pentane, isooctane and cyclohexane are preferred. By nonaromatic hydrocarbons is intended cyclic and acyclic alkanes and alkenes. 2-pyrrolidone is reported to be completely miscible with water, ether, ketones, esters, alcohols and chlorinated and aromatic hydrocarbons, all of which are consequently believed to be unsuitable inert nonsolvents (Kirk-Othmer, Encyclopedia of Chemical Technology, 2nd Ed., Vol. 16, p. 851). The inert nonsolvent in the present process serves the purpose of preventing appreciable agglomeration of polymer into large hard solid masses, and also is believed to dissipate, distribute or moderate the heat of reaction.

The insoluble salt finding use within the scope of the present invention is characterized in that it is substantially insoluble in both the inert nonsolvent and the monomer. Preferably the insoluble salt is easily soluble in water or aqeuous wash solutions. Put in another way at the weight ratio and temperature specified, the insoluble salt saturates the reaction mixture, leaving the bulk of its weight present undissolved in the reaction mixture. Such insoluble salts can be illustrated by numerous inorganic compounds including halides, acetates, oxalates, carbonates, molybdates, nitrates, sulfates, oxides, thiocyanates, permanganates, phosphates, etc., containing various cations selected from among metals such as the alkali metals, the alkaline earth metals, Group VIII metals, titanium, silicon, aluminum and nonmetallic cations such as ammonium. The alkali and alkaline earth halides, carbonates and bicarbonates are the preferred insoluble salts and among these sodium and potassium salts are particularly preferred. Mixtures of salts can be used, such as KCl/NaCl, $K_2CO_3$/KHCO$_3$, $K_2CO_3$/NaCl, etc., in various ratios, but the specified weight ratios refer to total salt present in the reaction mixture.

The alkaline polymerization catalyst is selected from among any of those disclosed in U.S. Pat. Nos. 3,721,652 and 2,638,463. In general, alkaline polymerization catalysts are made from aklkaline compounds including the alkali metals, salts of these metals, hydroxides, alcoholates, carbonates and oxides of the alkali metals, alkaline earth metals and hydroxides, strongly basic organometallic compounds and organic bases such as quaternary ammonium hydroxide (U.S. Pat. No. 2,973,343). The alkali metals are generally effective either in metallic form or in the form of hydrides, borohydrides, oxides, hydroxides, alkoxides, carbonattes, amides, etc; and the organometallic compounds include lithium and potassium alkyls and aryls. Mixtures of these compounds also can be employed. The alkaline polymerization catalyst is preferably made from potassium hydroxide.

The preferred alkaline polymerization catalyst is potassium pyrrolidonate. It is preferably made in situ by the addition of potassium hydroxide to more than an equivalent amount of 2-pyrrolidone, but there are numerous other ways of making it, as by the addition of the potassium compounds, or mixtures thereof, enumerated above to 2-pyrrolidone. If KOH is used to prepare the catalyst, it can be added either in solid form or as an aqeuous KOH solution (U.S. Pat. No. 3,778,402), the latter lending itself to continuous operation. In either case, after the addition of KOH to 2-pyrrolidone, water is removed to give a substantially anhydrous solution of potassium pyrrolidonate in 2-pyrrolidone. Solid KOH pellets (85% KOH, 15% water) have been employed, as have aqeuous KOH solutions having a KOH content of 10–65% by weight. As noted elsewhere, U.S. Pat. No. 3,778,402, the polymerization is sometimes depressed if the period between KOH addition to the pyrrolidone and the removal of water is an extended period. Consequently, in the production of the alkaline catalyst from KOH, water is normally removed promptly by distillation under reduced pressure and distillation is normally continued until 2-pyrrolidone begins to distill over.

The polymerization of 2-pyrrolidone is usually carried out in the presence of an activator (initiator) of polymerization. Many types of initiators have been suggested, including acyl derivatives, U.S. Pat. No. 2,739,959; N-acyl lactams, U.S. Pat. No. 2,809,958; oxides of Group VI such as $SO_2$, U.S. Pat. No. 3,174,951; halides and oxyhalides, halosilanes, $CS_2$, amides, sulfoamides, isocyanates, $NO_2$, carbonyl halides, etc. Of these, the preferred initiators are $SO_2$ and $CO_2$, or are derived from $SO_2$ or $CO_2$. $CO_2$ is most preferred (U.S. Pat. No. 3,721,652). Of course, mixed initiators may also be utilized.

In the preferred practice of making poly-2-pyrrolidone, the alkaline polymerization catalyst is prepared in situ with the monomer to be polymerized as by the addition of less than an equivalent stoichiometric amount of a source of alkali metal to 2-pyrrolidone. Then $CO_2$ is bubbled into the mixture. The inert nonsolvent and insoluble salt are added to the mixture before, or after, the addition of initiator. As an alternative to the in situ method, it is also possible to make and separate an adduct of $CO_2$ and the catalyst. The adduct is then added to the reaction mixture to effect polymerization. Such catalyst adducts with $CO_2$ comprise adducts of alkali metal salts of 2-pyrrolidone and caprolactam with $CO_2$.

The total alkaline polymerization catalyst comprises from about 0.5 to 30 mol percent, or higher, of the monomer-catalyst mixture, based on total monomer. Preferably about 5–20 mol percent, and most preferably about 10 mol percent catalyst is used. Total monomer consists of 2-pyrrolidonate catalyst, 2-pyrrolidone provided as solvent for said catalyst, 2-pyrrolidonate catalyst having formed an adduct with the initiator and any additional monomer charged to the reactor.

A polymerization initiator is normally used in amounts sufficient to effect substantial conversion and reasonable yields of high viscosity polymer in a reasonable period of time. Up to 0.2 mol of initiator per mol of monomer is used, but normally about 0.02–10 mol percent initiator, based on total monomer, is preferred, and about 1–5 mol percent is most preferred. When used as co-initiators, compounds such as N-acyl pyrrolidone, phthalic anhydride, pyromellitic dianhydride, $CS_2$, ethylene carbonate and trifluoromethane sulfonic ahydride, in amounts of about 0.01–0.02 mol percent, based on total monomer, may accelerate the polymerization of 2-pyrrolidone.

The preferred initiator, $CO_2$, is preferably added in amounts based on the total number of mols of alkaline polymerization catalyst. Total alkaline polymerization catalyst is defined as the amount of unreacted catalyst plus the amount of catalyst forming an adduct with the $CO_2$. After the in situ production of the catalyst in 2-pyrrolidone solution, as heretofore described, from 0.06, or less, to about 0.8 mols of $CO_2$ per mol of catalyst is added to the catalyst in 2-pyrrolidone solution. As an example of the in situ production of catalyst, consider the hypothetical situation of 100 mols of 2-pyrrolidone to which 10 mols of KOH are added to form 10 mols of potassium pyrrolidonate, leaving 90 mols of unreacted 2-pyrrolidone. The solution is thus 10 mol percent catalyst based on total monomer. If 3 mols of $CO_2$ are then added to form 3 mols of a $CO_2$-catalyst adduct, leaving 7 mols of unreacted catalyst, the solution then contains 3 mol percent initiator based on total monomer or 30 mol percent initiator based on total catalyst.

In general, whether the catalyst is produced in situ, or catalyst and initiator are made and added separately, the reaction mixture can comprise from about 1 to about 100 mol percent, but preferably comprises about 5–60 mol percent, initiator based on total catalyst, but about 10–40 mol percent initiator is particularly preferred.

In the present process the inert nonsolvent, in which 2-pyrrolidone is not appreciably miscible or soluble, is present in the reaction mixture to the extent of about 0.2–20:1, preferably from about 0.5:1 to about 4:1, and more preferably from about 2:1 to about 3:1, in weight ratio to 2-pyrrolidone, based on total 2-pyrrolidone.

The insoluble salt is present in the reaction mixture to the extent of from about 1:1 to about 10:1, or more preferably greater than 3:1, i.e., 3–10:1, and most preferably from about 3:1 to 5:1, in weight ratio to 2-pyrrolidone, based on total 2-pyrrolidone.

2-pyrrolidone may be polymeized at a temperature of from about 18° C to about 100° C, preferably 25° C to 70° C, and most preferably from about 40° C to about 60° C, under a pressure ranging from subatmospheric to superatmospheric, in the presence of the alkaline polymerization catalyst for a period from about 4 to 100 hours or longer, preferably from about 8 to about 72 hours, more preferably from about 8 to about 48 hours. In continuous operation, polymerization times refer to average residence under polymerization conditions.

The reaction mixture comprises, in addition to monomer, an insoluble salt, an inert nonsolvent, an alkaline polymerization catalyst and preferably a polymerization initiator. Substantially anhydrous polymerization conditions are preferred; i.e., a slight amount of water, nor exceeding about 0.1–0.2% by weight, based on total monomer, is permissible in the reaction mixture, but less than 0.1 weight percent water is preferred.

Since the reaction mixture is preferably substantially anhydrous, both the inert nonsolvent and the salt are preferably added in substantially anhydrous form. It is preferred that the salt be in the form of relatively small, dry crystals. The removal of the insoluble salt by aqeuous washing of the product is facilitated by its water solubility. It is preferred that the polymer product not be appreciably contaminated with the salt or other impurities.

An agitated reaction mixture is employed in the process of the present invention. Agitation of the reaction is usually provided by a reactor with agitating means such as a mechanically stirred reactor, a reactor with Brabender attachments, a ball mill reactor and others capable of producing agitation of the reaction mass during polymerization. It is preferred that a stirred reactor or ball mill reactor be used, but this is not essential. In a typical ball mill reactor, the polymerizate and inert components are charged to a cylinder partly filled with small objects such as balls made from an inert material such as stainless steel, glass, or a ceramic material. The cylinder is rotated about its axis as the polymerization reaction proceeds at the desired temperature.

The solid product is separated from the reaction mixture by any convenient means such as filtration or centrifugation. In continuous operation, since the inert nonsolvent liquid normally is less dense than the solid product, said product separates gravimetrically at a rate and particle size controllable by process conditions, including the rate of agitation. The selection of separating means, or process conditions effecting continuous separation of the solid product, is considered well within the skill of ordinary workers in this art.

If necessary, the solid product is comminuted to granules by the usual means of chopping, cutting or grinding, all of which are adaptable to continuous operation.

In the process of the present invention, the particulate solid product, or comminuted solid, is washed with water or other suitable solvent for removal of catalyst, inert nonsolvent, salt, monomer and other low-molecular-weight components of the reaction mixture. Such an extraction can be performed discontinuously in large washing containers, or continuously in extraction columns. In the usual continuous extraction process, the granulate is introduced into an extraction column at the top and an aqeuous wash enters at the bottom and flows upwardly in counterflow to the granules. At the bottom of the extraction column the granulate, substantially freed of low-molecular-weight components, is discharged, while the wash water, now charged with catalyst, salt and other low-molecular-weight components, is drawn off at the upper end of the extraction column.

A product of the novel process of this invention is a solid polymeric material, poly-2-pyrrolidone. The product is obtained as a particulate solid or easily comminuted solid product. The solid polypyrrolidone obtained as product in the instant process will vary from a fine powder to heavy flakes or granules or a thick curd, depending on the degree of conversion, the amount and type of agitation, the ratio of inert nonsolvent to monomer, and the ratio of salt to monomer. The preferred reaction conditions are those providing a particulate product of from about 0.01 to about 2 mm diameter, and preferably from 0.1 to 1 mm diameter for more rapid monomer and catalyst removal. Product whiteness, polymer viscosity and melt spinnability (U.S. Pat. No. 3,721,652) are also important considerations in the choice of preferred process parameters.

Preparation of poly-2-pyrrolidone, according to the novel process of this invention, can be carried out with various amounts of monomers, catalysts, salts, inert nonsolvent liquids, initiators and other additives — the amount of each being properly coordinated to produce the most effective polymerization. Although the preferred amounts of the components in the reaction mixture have been given, it is to be understood that these are not intended to be limitations to polymerization, since it may be possible to effect substantial polymerization outside the preferred ranges.

Polymers of 2-pyrrolidone are converted into useful articles such as shaped objects, fibers, filaments, rods, bristles, films, ribbons and the like by melt spinning, melt extrusion, molding, etc. Poly-2-pyrrolidone is characterized by its high softening temperature and its suitability for extrusion into filaments which can be cold-drawn to high tenacity. From the substantially pure monomer this process is capable of producing a fiber-forming polymer of 2-pyrrolidone of high viscosity and whiteness as described in Barnes, U.S. Pat. No. 3,721,652.

EXAMPLES

Example 1 shows the in situ preparation of the alkaline polymerization catalyst and initiator, and bulk polymerization.

EXAMPLE 1

200 g of 2-pyrrolidone (2.35 mols) distilled from 2% sulfuric acid solution was contacted with 15.5 g (0.24 mol) of potassium hydroxide pellets (86.2% KOH) in a stirred reactor and the mixture heated to incipient distillation over a period of 25 minutes under reduced pressure. The mixture contained 10 mol percent potassium pyrrolidonate based on total monomer. The mixture was cooled to 30° C and a calibrated amount of $CO_2$ was introduced to produce carbonated potassium pyrrolidonate in 2-pyrrolidone solution containing 30 mol percent carbonated potassium pyrrolidonate, based on total potassium pyrrolidonate. The solution was poured into a dried polyethylene bottle and placed in an oven at 50°–54° C for a period of 22 hours. The bottle, containing the hardened bulk-polymerized poly-2-pyrrolidone, was cut into four pieces and ground into granules. 148.58 g of the bottle's contents were washed with water until the filtrate had a pH of 6.5 and were dried in an oven at 70° C to constant weight. The yield was 60.5 g (43.3% conversion based on total 2-pyrrolidone — 43.4=100[212.77×60.5/148.58×200]), and the polymer had a viscosity on the Gardner scale of greater than Z.

Examples 2–4 show the use of a nonsolvent in an agitated reaction mixture without the addition of an insoluble salt.

EXAMPLE 2

Carbonated alkaline polymerization catalyst in 2-pyrrolidone solution having 10 mol percent potassium pyrrolidonate, based on total 2-pyrrolidone, and 30 mol percent $CO_2$, based on total potassium pyrrolidonate, was prepared as in Example 1. 170.39 g of the carbonated catalyst solution and 130.08 g of purified hexane were charged into a stirred reaction vessel. After about 20 hours at about 60°±10° C the flask's contents were too hard to stir. After washing and drying as in Example 1, the yield was 47.01 g (29.4% conversion) and the viscosity of the polymer was rated Y on the Gardner Viscosity Scale.

EXAMPLE 3

78.03 g of carbonated potassium pyrrolidonate solution in 2-pyrrolidone, prepared as in Example 1, were charged into a stirred reaction vessel with 110.05 g of purified n-hexane and stirred for 22 hours at about 50°–55° C. The vessel's contents were not easily removed. The contents were chopped in a Waring blender, filtered, washed and dried. The yield was 23.88 g (32.6% conversion) and the polymer had a viscosity greater than Z on the Gardner Viscosity Scale.

EXAMPLE 4

41.62 g of carbonated potassium pyrrolidonate in 2-pyrrolidone solution, prepared as in Example 1, were charged into a stirred reaction vessel with 99.64 g of hexane. The mixture was stirred for 23 hours at 50° C. The contents were removed with difficulty and worked up as in previous examples, yielding 9.04 g of polymer (23% conversion), having a viscosity of Y-Z on the Gardner Scale. In a comparative bulk polymerization, 61.27 g of the same catalyst solution were charged to a polyethylene bottle without hexane and heated at 50° C for 23 hours. The hardened contents had to be cut with a chisel and chopped in a Waring blender. The polymer yield was 27.33 g (47.7% conversion), and had a viscosity of V on the Gardner Scale.

The following examples show the preparation of poly-2-pyrrolidone by alkaline-catalyzed polymerization with an insoluble salt and a nonsolvent present in an agitated reaction.

EXAMPLE 5

29.29 g of carbonated potassium pyrrolidonate in 2-pyrrolidone solution, prepared as in Example 1, were charged to a reaction vessel with 67.22 g of purified hexane and 100 g of dry NaCl. The mixture was stirred at 50° C for 20 hours. The not-too-viscous contents stirred well at all times. The product was a granular white polymer. 200 ml of water were added and the contents poured from the flask without sticking to walls or stirrer. Worked up as in previous examples, the yield was 6.81 g of polymer (24.8% conversion), having a viscosity on the Gardner Scale of W-X.

EXAMPLE 6

99 g of carbonated potassium pyrrolidonate in 2-pyrrolidone solution, prepared as in Example 1, were charged to a flask containing 200 g of dry NaCl and 66.0 g of purified n-hexane. The mixture was stirred at 50° C overnight. The flask's contents were easily removed, washed with water to pH 6.5 and negative chloride ion test ($AgNO_3+HNO_3$) and dried. The polymer yield was 26.04 g (28% conversion), having a viscosity on the Gardner Scale of X-Y.

EXAMPLE 7

98.51g of carbonated potassium pyrrolidonate in 2-pyrrolidone solution, prepared as in Example 1, were charged to a reaction vessel with 100 g of dry NaCl and 65.97 g of purified hexane. The mixture was stirred for 21 hours at 50° C. The flask's contents were easily removed, washed and dried as in Example 6. The polymer yield was 21.70 g (23.4% conversion), having a viscosity on the Gardner Scale of X.

EXAMPLE 8

51.95 g of carbonated potassium pyrrolidonate in 2-pyrrolidone solution, prepared as in Example 1, were charged in a reaction vessel with 100 g of dry NaCl and 105.8 g of hexane. The mixture was stirred at 50° C for 19 hours. The vessel's contents were easily removed and worked up as in Example 6. The polymer yield was 10.48 g (21.6% conversion), having a viscosity on the Gardner Scale of Y-Z.

EXAMPLE 9

51.0 g of carbonated potassium pyrrolidonate in 2-pyrrolidone solution, prepared as in Example 1, were charged to a Waring blender with 89.23 g of paraffin oil and 100 g of dry NaCl. The mixture was stirred at high speed for 19 hours at 50° C. The blender's contents, being very hard and difficult to remove, were chopped with a chisel, soaked in hexane, filtered, chopped and washed and dried as in previous examples. The polymer yield was 28.28 g of a yellowish solid, having a viscosity on the Gardner scale of U-V.

EXAMPLE 10

20.82 g of carbonated potassium pyrrolidonate in 2-pyrrolidone solution, prepared as in Example 1, were charged to a polypropylene bottle with 50 g of dry NaCl and 34.39 g of purified hexane. The mixture was shaken for 20 hours at 30°–39° C. The bottle's contents were found to agglomerate into large balls and slight discoloration occurred. The bottle's contents were comminuted and worked up as in previous examples. The polymer yield was 6.32 g (32.4% conversion).

TABLE

| Example/ Particulate Quality | Weight Ratio Salt/Monomer | Weight Ratio Nonsolvent/ Monomer | Viscosity | % Conversion |
|---|---|---|---|---|
| 1 very poor | 0 | 0 | >Z | 43.3 |
| 2 very poor | 0 | 0.8 | Y | 29.4 |
| 3 poor | 0 | 1.5 | >Z | 32.6 |

TABLE-continued

| Example/ Particulate Quality | Weight Ratio Salt/Monomer | Weight Ratio Nonsolvent/ Monomer | Viscosity | % Conversion |
| --- | --- | --- | --- | --- |
| 4 poor | 0 | 2.6 | Y-Z | 23 |
| 5 excellent | 3.6 | 2.5 | W-X | 24.8 |
| 6 good | 2.1 | 0.7 | X-Y | 28 |
| 7 good | 1.1 | 0.7 | X | 23.4 |
| 8 good | 2.1 | 2.2 | Y-Z | 21.6 |
| 9 poor | 2.1 | 1.9 | U-V | — |
| 10 poor-good | 2.6 | 1.8 | — | 32.4 |

Polymer viscosity is measured at room temperature (about 25° C) on the Gardner Viscosity Scale using a Gardner-Holdt Bubble Viscometer. 0.5 grams of polymer is dissolved in 10 ml of concentrated formic acid (90 percent by weight HCOOH, 10 percent water). The polymer solution is compared in viscosity to the Gardner Bubble Standards, e.g., Standard U corresponds to 6.27 stokes, Standard Z corresponds to 22.7 stokes ("Physical and Chemical Examination, Paints, Varnishes, Lacquers and Colors" by H. A. Gardner and G. G. Sward, 12th Ed., 1962, distributed by Gardner Laboratory Company, Inc., Bethesda, Md.).

The product of each example is rated in the Table as to its particulate character or how easily it is comminuted. Bulk polymerization (Example 1) or small weight ratio of hexane (Example 2) gave very hard nonparticulate solid products. The best particulate product is obtained with a weight ratio of salt to monomer greater than about 3 (Example 5).

What is claimed is:

1. The process for polymerizing 2-pyrrolidone comprising agitating 2-pyrrolidone, alkaline polymerization catalyst, polymerization initiator, an inert nonsolvent in weight ratio to 2-pyrrolidone of about 0.5–20:1, and an insoluble salt, which is alkali metal halide in weight ratio to 2-pyrrolidone of about 1–10:1 at a temperature of from 25° to about 70° C for 4 to about 100 hours to form a particulate poly-2-pyrrolidone product.

2. The process according to claim 1 wherein said alkaline polymerization catalyst is selected from the group consisting of the reaction product of alkali metal, alkali metal hydroxide, alkali metal carbonate, and quaternary ammonium hyroxide with 2-pyrrolidone.

3. The process according to claim 2 wherein said polymerization initiator is $CO_2$, or derived from $CO_2$.

4. The process according to claim 1 wherein said insoluble salt is present in the reaction mixture to an extent greater than about 3:1 weight ratio to 2-pyrrolidone.

5. The process according to claim 1 wherein said inert nonsolvent is a $C_5$–$C_{10}$ nonaromatic hydrocarbon or mixture thereof.

6. The process according to claim 1 wherein said insoluble salt is sodium chloride.

7. The process according to claim 1 wherein said inert nonsolvent is present in the reaction mixture to the extent of from about 2:1 to about 3:1 weight ratio to 2-pyrrolidone.

8. The process for polymerizing 2-pyrrolidone by agitating a reaction mixture containing 2-pyrrolidone, alkaline polymerization catalyst, polymerization initiator, and inert nonsolvent in weight ratio to 2-pyrrolidone of about 0.5 – 20:1, and an insoluble salt, which is alkali metal halide, in such weight ratio to 2-pyrrolidone as to saturate the reaction mixture leaving the bulk of its weight present undissolved in the reaction mixture, at a temperature of from 25° to about 70° C for 4 to about 100 hours to form a particulate poly-2-pyrrolidone product.

9. The process according to claim 8 wherein said insoluble salt is present in said reaction mixture in weight ratio to 2-pyrrolidone of about 1-14 10:1.

* * * * *